US009815201B2

(12) United States Patent
Embon et al.

(10) Patent No.: US 9,815,201 B2
(45) Date of Patent: Nov. 14, 2017

(54) METHOD AND APPARATUS FOR INDUSTRIAL ROBOTIC ENERGY SAVING OPTIMIZATION USING FLY-BY

(71) Applicant: Siemens Industry Software Ltd., Airport (IL)

(72) Inventors: Lisandro Embon, Petah Tikva (IL); Moshe Hazan, Elad (IL); Guillaume Ginioux, Toulouse (FR); Etienne Ferre, Toulouse (FR); Ambroise Confetti, Toulouse (FR); Matthias Frische, Ahlden (DE)

(73) Assignee: Siemens Industry Software Limited, Airport (IL)

( * ) Notice: Subject to any disclaimer, the term of this patent is extended or adjusted under 35 U.S.C. 154(b) by 687 days.

(21) Appl. No.: 14/448,763

(22) Filed: Jul. 31, 2014

(65) Prior Publication Data

US 2016/0031083 A1 Feb. 4, 2016

(51) Int. Cl.
*B25J 9/16* (2006.01)

(52) U.S. Cl.
CPC ........... *B25J 9/1676* (2013.01); *B25J 9/1666* (2013.01); *G05B 2219/32091* (2013.01); *G05B 2219/40473* (2013.01); *G05B 2219/40476* (2013.01); *Y02P 80/10* (2015.11); *Y10S 901/49* (2013.01)

(58) Field of Classification Search
CPC ........ B25J 9/1676; B25J 9/1666; Y02P 80/10; G05B 2219/40473; G05B 2219/40476; G05B 2219/32091; Y10S 901/49
See application file for complete search history.

(56) References Cited

U.S. PATENT DOCUMENTS

| | | | |
|---|---|---|---|
| 5,784,542 | A | 7/1998 | Ohm et al. |
| 6,004,016 | A | 12/1999 | Spector |
| 6,216,058 | B1 | 4/2001 | Hosek et al. |
| 6,493,607 | B1 | 12/2002 | Bourne et al. |
| 6,728,599 | B2 | 4/2004 | Wright et al. |
| 7,298,385 | B2 | 11/2007 | Kazi et al. |
| 7,386,365 | B2 | 6/2008 | Nixon |

(Continued)

FOREIGN PATENT DOCUMENTS

| | | | |
|---|---|---|---|
| DE | 102010052253 A1 | | 5/2012 |
| EP | 1090723 A2 | | 4/2001 |

(Continued)

OTHER PUBLICATIONS

U.S. Appl. No. 14/448,416, Non-Final Office Action dated Aug. 25, 2015, 9 pages.

(Continued)

*Primary Examiner* — Syed Roni (57) ABSTRACT

Methods for optimizing energy savings and reducing cycle time for mutating an industrial robotic path when a collision is detected. A method includes initializing a plurality of clone paths where a collision was detected, wherein a clone path is a clone of the initial path and the initial path comprises a source location, a plurality of intermediate locations, and a target location; for each clone path, determining a candidate path to store in a population, determining an optimal breed comprising the candidate path with an optimal rating, wherein the optimal rating is determined by the lowest breed rating in the population, and returning the optimal breed.

20 Claims, 3 Drawing Sheets

(56) References Cited

U.S. PATENT DOCUMENTS

| | | | |
|---|---|---|---|
| 8,401,698 | B2 | 3/2013 | Kamrani et al. |
| 8,447,455 | B2 | 5/2013 | Matsunaga |
| 8,620,473 | B2 | 12/2013 | Diolaiti et al. |
| 9,057,621 | B2 | 6/2015 | Tate et al. |
| 9,298,863 | B2 * | 3/2016 | Hazan ............... G06F 17/5009 |
| 9,469,029 | B2 * | 10/2016 | Hazan ................. B25J 9/1661 |
| 2004/0111183 | A1 | 6/2004 | Sutherland et al. |
| 2005/0055132 | A1 | 3/2005 | Matsumoto et al. |
| 2005/0137648 | A1 | 6/2005 | Cosendai et al. |
| 2005/0197680 | A1 | 9/2005 | DelMain et al. |
| 2006/0025890 | A1 | 2/2006 | Nagatsuka et al. |
| 2006/0145647 | A1 | 7/2006 | Kitatsuji et al. |
| 2006/0217841 | A1 | 9/2006 | Matsumoto et al. |
| 2006/0287769 | A1 | 12/2006 | Yanagita et al. |
| 2008/0009971 | A1 | 1/2008 | Kim et al. |
| 2008/0306628 | A1 | 12/2008 | Ng-Thow-Hing et al. |
| 2009/0105880 | A1 | 4/2009 | Okazaki |
| 2010/0224022 | A1 | 9/2010 | Choi et al. |
| 2010/0305751 | A1 | 12/2010 | Nagatsuka |
| 2011/0153080 | A1 | 6/2011 | Shapiro et al. |
| 2012/0158174 | A1 | 6/2012 | Moon et al. |
| 2012/0165982 | A1 | 6/2012 | Kim et al. |
| 2012/0290131 | A1 | 11/2012 | Khoukhi |
| 2013/0030569 | A1 | 1/2013 | Fudaba et al. |
| 2013/0116822 | A1 | 5/2013 | Atohira |
| 2014/0005804 | A1 | 1/2014 | Brand |
| 2014/0156068 | A1 | 6/2014 | Graca et al. |
| 2014/0163736 | A1 | 6/2014 | Azizian et al. |
| 2014/0207837 | A1 | 7/2014 | Taniguchi et al. |
| 2014/0257558 | A1 | 9/2014 | Frische et al. |
| 2015/0148952 | A1 | 5/2015 | Shiratsuchi |
| 2015/0177194 | A1 | 6/2015 | Xu et al. |
| 2015/0278404 | A1 | 10/2015 | Embon et al. |
| 2015/0278406 | A1 | 10/2015 | Embon et al. |

FOREIGN PATENT DOCUMENTS

| | | |
|---|---|---|
| EP | 2157490 A1 | 2/2010 |
| EP | 2485875 B1 | 4/2013 |
| WO | 2005049284 A1 | 6/2005 |
| WO | 2005124486 A2 | 12/2005 |
| WO | 2011042293 A1 | 4/2011 |
| WO | 2014052286 A1 | 4/2014 |

OTHER PUBLICATIONS

U.S. Appl. No. 14/197,620, Final Office Action dated Jul. 31, 2015, 16 pages.

Gasparetto et al. "Trajectory Planning in Robotics," Mathematics in Computer Science, vol. 6, No. 3, Aug. 30, 2012, pp. 269-279, XP035125437, 11 pages.

Cao, Bailin et al. "Practical Implementation of Time-efficient Trajectory Planning for Two Cooperative Industrial Robot Arms", Proceedings of the 1996 IEEE/RSJ International Conference on Robots and Systems (IROS). Robotic Intelligence Interacting with Synamic Worlds, Osaka, Nov. 4-8, 1996, XP000771580, ISBN: 978-0-7803-3214-0, 8 pages.

Wang, Fei-Yue et al. "Planning Time-Optimal Trajectory for Coordinated Robot Arms", Proceedings of the International Conference on Robotics and Automation Atlanta, May 2-6, 1993, Los Alamitos, IEEE Comp. Soc. Press, US, vol. Conf. 10, May 2, 1993, XP010095120, ISBN: 978-0-8186-3450-5, 6 pages.

Baba N. et al: "Collision avoidance planning of a robot manipulator by using genetic algorithm—A consideration for the problem in which moving obstacles and/or several robots are included in the workspace"; Evolutionary Computation, 1994; IEEE World Congress on Computational Intelligence; First IEEE Conference Orlando, Fl. USA Jun. 27-29, 1994; XP010122796; ISBN: 978-0-7803-1899-1, 6 pages.

EP Search Report dated Feb. 4, 2016, for EP Application No. 15175973.5, 10 pages.

Chen, P., et al. "SANDROS: A Motion Planner with Performance Proportional to Task Difficulty," Proceedings of the 1992 IEEE International Conference on Robotics and Automation, Nice, France, May 1992, 8 pages.

Faverjon, B., et al., "The mixed Approach for Motion Planning: Learning Global Strategies from a Local Planner," Proceedings of the International Joint Conference on Artifical Intelligence, Jan. 1, 1987, 7 pages.

Gueta, L., et al., "Compact Design of Work Cell with Robot Arm and Positioning Table Under a Task Completion Time Constraint," 2009 IEEE/RSJ International Conference on Intelligent Robots and Systems, St. Louis, MS, USA, Oct. 11-15, 2009, 7 pages.

Gueta, L., et al., "Practical Point-to-Point Multiple-Goal Task Realization in a Robot Arm with a Rotating Table," Advanced Robotics, vol. 25, No. 6-7, 2011, pp. 717-738.

Hirakawa, A., "Trajectory Generation for Redundant Manipulators Under Optimization of Consumed Electrical Energy," Conference Record of the 1996 IEEE Industry Applications Conference—31st IAS Annual Meeting, IEEE Service Center, US, vol. 6, Oct. 6, 1996, XP010201236.

Hwang, Y,. et al., "Optimizing Robot Placement for Visit-Point Tasks" Proceedings of the AI and Manufacturing Research Planning Workshop, Albuquerque, NM, USA, Jun. 1996, 7 pages.

Foreign Communication From a Related Counterpart Application, PCT Application No. PCT/US2013/061340, International Search Report dated Jan. 31, 2014, 6 pages.

Foreign Communication From a Related Counterpart Application, PCT Application No. PCT/US2014/021801, International Search Report dated Sep. 3, 2014, 5 pages.

Sanchez, G. et al. "Locally-Optimal Path Planning by Using Probabilistic RoadMaps and Simulated Annealing." Proceedings of IASTED International Conference on Robotics and Applications. (Oct. 1999) (6 pages).

Ahuactzin, J.M. et al. "Using genetic algorithms for robot motion planning." in Proc. of 10th European Conference on Artificial Intelligence. (1992) (5 pages).

Pack, D., et al. "Robot trajectory planning using a genetic algorithm." SPIE, 2824, (1996) pp. 171-182.

Tian, L., et al. "An effective robot trajectory planning method using a genetic algorithm." Mechatronics, 14, (2004) pp. 455-470.

Yue, S.G., et al. "Point-to-point trajectory planning of flexible redundant robot manipulators using genetic algorithms." To appear in Robotica, (2001) pp. 1-24.

Skiena, Steven S. "The Algorithm Design Manual." 2nd ed, Chapter 6, Springer London, Aug. 2008, pp. 191-229.

Hein, B., et. al. "Automated generated collision-free time optimization robot movements in industrial environments based on rounding." International Symposium on Assembly and Task Planning. (May 2001) p. 110-115.

Bohlin, R. and Kavraki, L.E. "Path Planning Using Lazy RPM." Proceedings of the 2000 IEEE international conference on Robotics & Automation. (Apr. 2000) pp. 521-528.

Bernhardt, R., et al. "The Virtual Robot Controller (VRC) Interface." ISATA 2000, Automation & Transportation Technology Simulation and Virtual Reality. Dublin, Ireland, Sep. 25-27, 2000, 6 pages.

Bernhardt, R., et al. "Realistic Robot Simulation in Concurrent Engineering of Manufacturing Lines in Automotive Industries." Eighth ISPE Int'l Conference on Concurrent Engineering: Research and Applications, Jul. 29-Aug. 1, 2002, 5 pages.

Willnow, C., et al. "Virtual Time Management of Virtual Robot Controllers." Modelling and Simulation 2001, 15th European Simulation Multiconference 2001, ESM' 2001, Jun. 6-9, 2001, Prague, Czech Republic, 8 pages.

Bernhardt, R., et al. "Virtual Robot Controllers as Simulation Agents." 2nd Workshop on Agent-Based Simulation. ISBN 1-56555-215-6. Apr. 2-4, 2001, Passau, Germany, 6 pages.

Bernhardt, R., et al. "Development of Virtual Robot Controllers and Future Trends." 6th IFAC Symposium on "Cost oriented Automation." Berlin, Germany, Oct. 8-9, 2001, 7 pages.

(56) References Cited

OTHER PUBLICATIONS

Bernhardt, R., et al. "Von realistischer roboter simulation zu virtuellen steuerungen." ZWF, Zeitschrift fur wirtschaftlichen Fabrikbetrieb, 2000, Munich, 5 pages. (No English translation available).
Bernhardt, R., et al. "Virtual Robot Controller (VRC) Interface." Robotik. (2000) (7 pages). (No English translation available).
"Realistic Robot Simulation (RRS)." www.realistic-robot-simulation.org, Fraunhofer IPK. (2009) Retrieved Jul. 26, 2014, 4 pages.
Vergnano, Alberto et al. "Modeling and Optimization of Energy Consumption in Cooperative Multi-Robot Systems" IEEE Transactions on Automation Science and Engineering, vol. 9. No. 2, Apr. 2012, 6 pages.
Diaz, Nancy et al. "Cost and Energy Consumption Optimization of Product Manufacture in a Flexible Manufacturing System" Laboratory for Manufacturing and Sustainability, University of California at Berkeley, USA, 8 pages, 2012.

* cited by examiner

METHOD AND APPARATUS FOR INDUSTRIAL ROBOTIC ENERGY SAVING OPTIMIZATION USING FLY-BY

CROSS-REFERENCE TO OTHER APPLICATION

This application shares some subject matter with commonly-assigned, previously filed U.S. patent application Ser. No. 12/971,020 for "Method and Apparatus for Industrial Robotic Paths Cycle Time Optimization Using Fly By", which is hereby incorporated by reference.

TECHNICAL FIELD

The present disclosure is directed, in general, to automated industrial operations and robotics, and in particular to methods and systems for optimizing energy savings and reducing cycle time for mutating an industrial robotic path when a collision event is detected.

BACKGROUND OF THE DISCLOSURE

Product data management (PDM) systems manage product lifecycle management (PLM) systems and other data. Improved systems are desirable.

SUMMARY OF THE DISCLOSURE

Various disclosed embodiments include a method for optimizing energy savings and reducing cycle time for mutating an industrial robotic path when a collision is detected. The method includes initializing a plurality of selected clone paths where a collision was detected, wherein a selected clone path is a clone of the initial path and the initial path comprises a source location, a plurality of intermediate locations, and a target location. The method further includes for each selected clone path, determining a candidate path to store in a population comprises applying a plurality of mutations to the selected clone path, generating a graph with a plurality of zone permutation vertices for each of the plurality of intermediate locations of the selected clone path and a plurality of rating edges between each zone permutation vertex of consecutive locations, wherein each of the plurality of zone permutation vertices has a radius one increment larger than a previous zone permutation vertex, simulating a robotic movement of the candidate path, removing the candidate path when a collision is detected, calculating a breed rating for each of a plurality of candidate paths, wherein the breed rating comprises a summation of the rating edges for the candidate path, and storing the candidate path possessing the lowest breed rating in the population. The method further includes determining an optimal breed comprising the candidate path with an optimal rating, wherein the optimal rating is determined by the lowest breed rating. The method further includes returning the optimal breed.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Computer Aided Robotics (CAR) Tools may be used for path planning, however, the optimization of a path is typically very time-consuming. In particular, relying on a robot programmer to manually choose a best set of zones or decide which intermediate location to shift is a process based on trial and error and is strongly dependent on the programmer's expertise.

Path planning processes have been developed that attempt to find an efficient, collision-free path. Such path planning processes are often based on a standard (generic) robot controller model, which is used to simulate Point-to-Point motions quickly and accurately. Many modern robot controllers use a similar model for motion planning from a source configuration to a target configuration (using Fully Synchronized PTP Motion). It is therefore possible to plan a "raw" collision free path (with no zones) using a standard (generic) robot controller without using an actual robot controller (RCS module).

Adding zones to a path in an attempt to improve cycle time may make the path planning process more complicated. When zones are applied, the trajectory of the robot no longer depends solely on the source and target configurations and the individual way points are chosen. With zones, the trajectory of the robot past an intermediate location is additionally influenced by the locations that precede and follow the intermediate location of interest. Furthermore, although the basic concepts of fly-by are similar in modern robot controllers, the way they are implemented and the meaning of the fly-by parameters may differ in robot controllers from various robot vendors. For example, a fly-by parameter may represent the distance from the intermediate location measured in millimeters, or it may represent speed measured as a percentage of the maximum velocity of the robot. As implemented by a robot controller, a fly-by may be any motion instruction or combination of motion instructions that are associated with a robotic path location and allow the robot to pass near the location without stopping, rather than reaching the location and coming to a full stop. Therefore, a robot programmer may have difficulty obtaining accurate predictions of trajectory and cycle time for a path having zones with a path planning process that makes use of a generic robot controller.

Some systems achieve an accurate trajectory by simulating the path using an actual industrial robot controller, rather than by performing a series of consecutive Point-To-Point movements. However, industrial robot controllers typically employ a complex internal logic and running such simulations may be a time consuming task.

Efficient methods and processes according to the disclosure use an industrial robot controller to calculate an optimal list of zones for a given path, while keeping the path collision free. This can be highly beneficial in automated energy saving and cycle time optimization processes. Such processes may be employed, for example, within a fitness function of simulated annealing or genetic algorithms for path planning.

Methods and processes according to the disclosure can efficiently find an optimal (or near-optimal) set of fly-by values for a given path (that is, fly-by values that yield an optimal (or near-optimal) rating), while keeping the path collision free when implemented in the shop-floor. The disclosed method can be used in a CAR-Tool, where the robot motion will be calculated using a Realistic Controller Simulation (RCS) Module via the realistic robot simulation (RRS) standard interface.

Consideration of numerous additional constraints makes finding the optimal breed a complex task. Additional constraints can include whether the robot can reach all locations from a given robot position and whether any collisions occur with the robot and any objects within its environment. A limited cycle time for completing tasks is another constraint that relates to production costs.

Robots can be heavy power consumers. Robots work repeatedly on one or more tasks for long hours and have complex powertrains that can include engines, transmissions, and so on. In a typical production line, there can be many robots, which further amplifies these issues.

Embodiments according to the disclosure find the most efficient or optimal robot operation order based on given constraints and in terms of power consumption and cycle time. The energy to time correlation can include ratings and rankings of the results of simulations that generate power or energy consumption values and cycle time values.

Applying this approach on every robot in a production line reduces the energy consumption and task cycle time resulting in reduced production costs. The reduced production costs come from finding optimal operation order for each robot in the production line to reduce overall energy consumption and cycle time.

Figure 1:
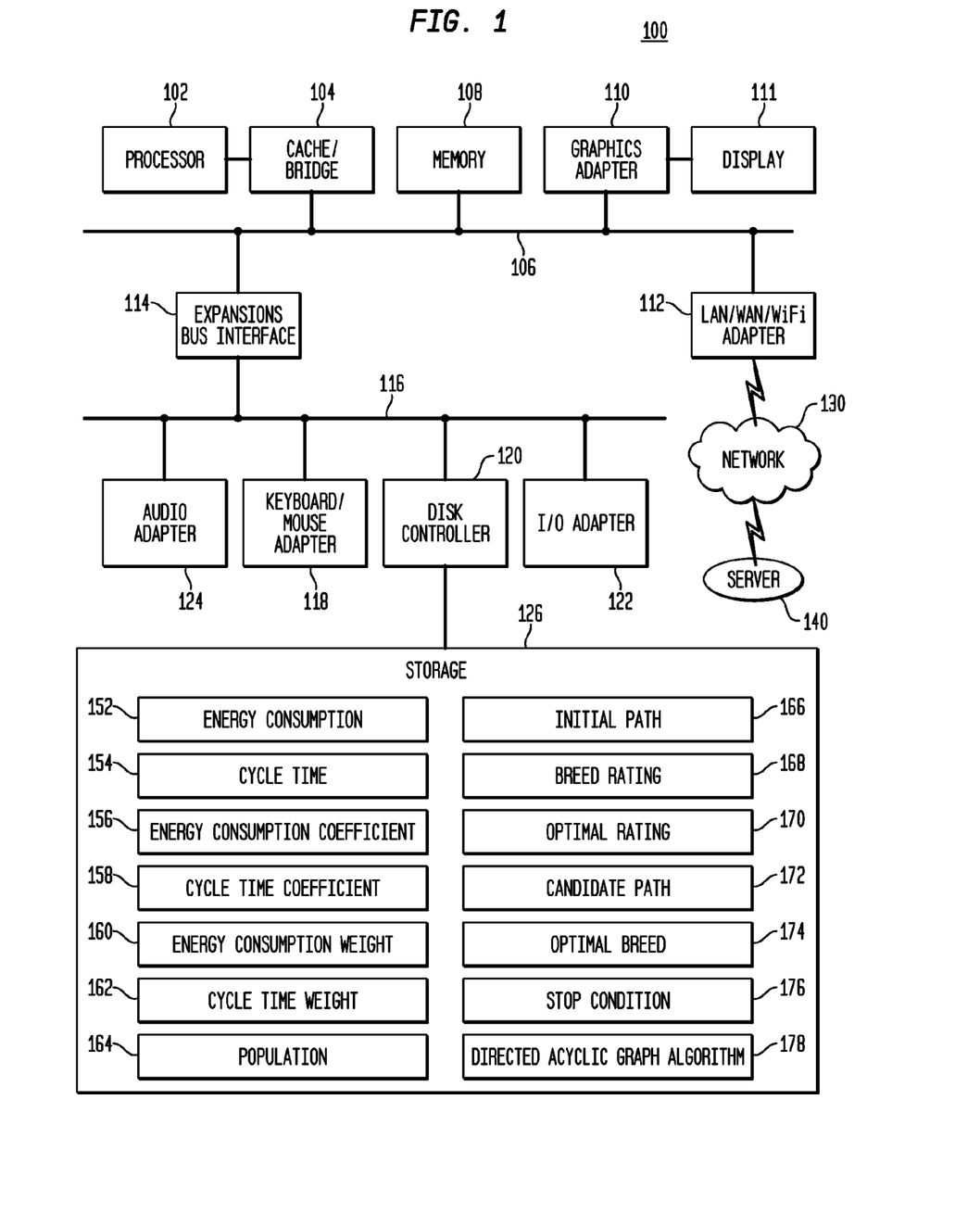
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system illustrated includes a processor 102 connected to a level two cache/bridge 104, which is connected in turn to a local system bus 106. Local system bus 106 may be, for example, a peripheral component interconnect (PCI) architecture bus. Also connected to local system bus in the illustrated example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores the energy consumption 152, the cycle time 154, the energy consumption coefficient 156, the cycle time coefficient 158, the energy consumption weight 160, the cycle time weight 162, the population 164, the initial path 166, the breed rating 168, the optimal rating 170, the candidate paths 172, the optimal breed 174, the stop condition 176, the DAG algorithm 178, and so on, which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware illustrated in FIG. 1 may vary for particular implementations. For example, other peripheral devices, such as an optical disk drive and the like, also may be used in addition or in place of the hardware illustrated. The illustrated example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
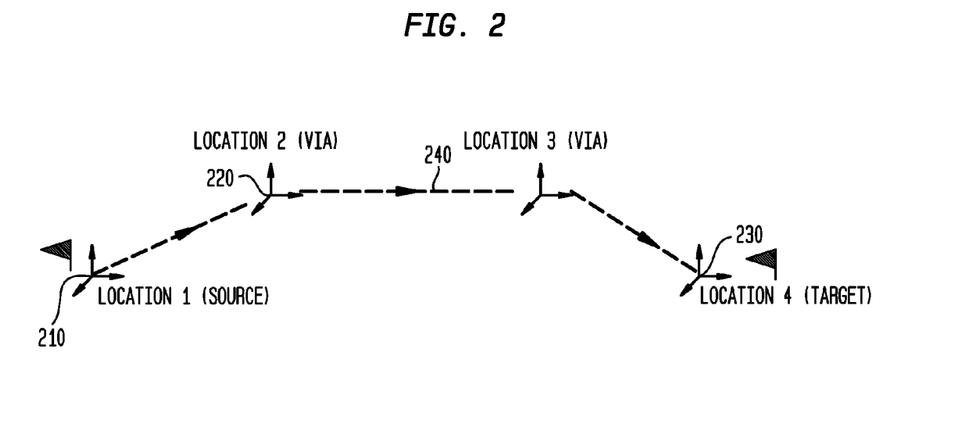
FIG. 2 illustrates a clone path copy of the initial path with mutations applied in accordance with the disclosed embodiments.

FIG. 2 illustrates a clone path 240 copy of the initial path 166 with mutations applied in accordance with the disclosed embodiments. The clone path 240 is a copy of the initial path 166 where the collision was detected. The initial path 166 contains a source location 210 and the target location 230. The clone path 240 with mutations comprises a source location 210, a plurality of intermediate locations 220, and a target location 230. When an intermediate location(s) is added to the clone path 240, the clone path 240 is altered. The alteration of the clone path 240 is performed in order to avoid a detected collision. Other mutations to remove collisions include removing a location, moving a location, or any other suitable mutation to remove a collision.

Figure 3:
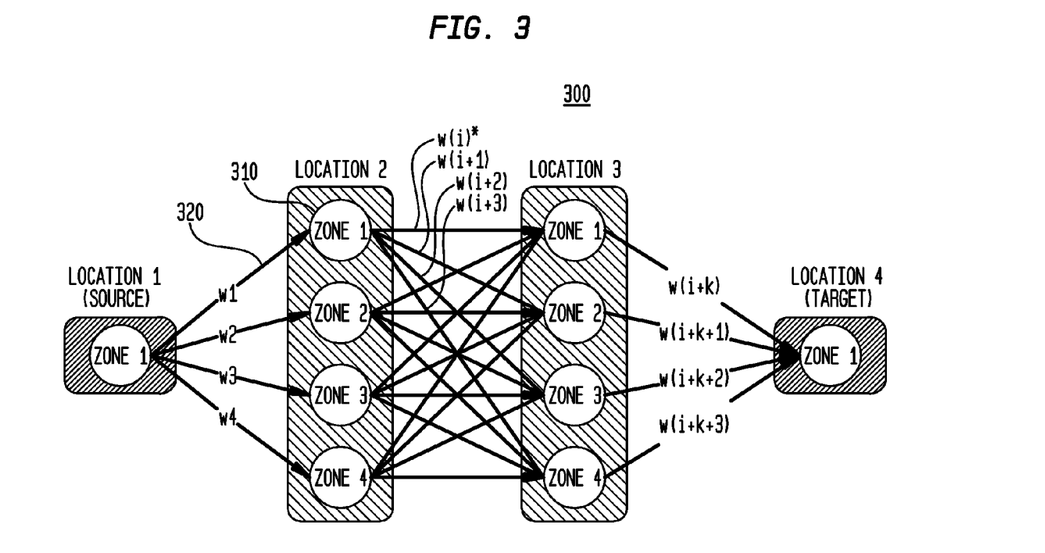
FIG. 3 illustrates a directed acyclic graph (DAG) of a candidate paths in accordance with the disclosed embodiments.

FIG. 3 illustrates a directed acyclic graph (DAG) 300 of candidate paths 172 in accordance with the disclosed embodiments. In some embodiments, the system builds (or creates) a weighted DAG 300, for example as described below: Each vertex in the DAG 300 corresponds to a zone permutation vertex 310. Vertices are created for all zone permutation vertices 310, except for the first and last locations of the path, which have only a single node, associated with a task location. Rating edges 320 are created to couple all zone permutation vertices 310 of adjacent locations in the clone path 240. The rating edges 320 direction corresponds to the order of the clone path 240 from a zone permutation vertex 310 of a location to each zone permutation vertex 310 of the next (or subsequent) location in the path. Rating edges 320 are assigned with a rating that is calculated using the energy consumption and cycle time of the robotic movement between locations.

A clone path 240 with 4 locations is translated to the DAG 300. The set of zone permutation vertices 310 consists of 4 zones, where zone 1 is a lowest zone and zone 4 is a largest zone. The zone $z_1$ may be a fine, or zero, zone. The rating function w( ) maps each zone to its rating. Values for w( ) in an exemplary embodiment may be w(1)=10, w(2)=5, w(3)=2, and w(4)=1. In other embodiments, more or fewer zones may be used and other weights may be assigned to the zones.

A process according to the disclosure modifies the DAG 300 iteratively in order to find a collision-free candidate path 172 with an acceptably high energy efficiency and short cycle time. The process achieves this goal by seeking a set of rating edges 320 that correspond to a lowest possible rating (i.e., the largest possible zones) and represent a candidate path 172 that is collision-free during simulation.

In some embodiments, the process for finding a collision-free candidate path 172 with an acceptably high energy efficiency and short cycle time 154 is as follows. At each step, the process uses the existing set of edges to find a candidate path 172 between the zone permutation vertex 310 of the first location and the zone permutation vertex 310 of the last location having a shortest cycle time 154, i.e., a candidate path 172 having a minimal sum of the weights of its constituent edges.

Since rating edges 320 connect only zone permutation vertices 310 of adjacent locations in the candidate path 172, and because the DAG 300 is constructed in topological order of the clone path 240, a valid candidate path 172 between the first and last zone permutation vertices 310 must consist of a single zone permutation vertex 310 corresponding to each location in the clone path 240. An important observation is that the process minimizes the sum of the edge ratings 320 of the candidate path 172.

Any collision that occurs during the motion from one location to the next indicates that at least one of the locations was assigned an invalid zone, and thus the combination of the two zones is invalid for these locations. Therefore, whenever collisions are detected, the process removes from the DAG 300 the rating edges 320 that connect between the zone permutation vertices 310 that correspond to the invalid locations-zones pairs.

With all the task locations designated, the simulation program calculates energy consumption 152 and cycle time 154 for all the rating edges 320 required for the robotic motion between all locations of the complex operation.

The cycle time 154 and the energy consumption 152 can be calculated from an RRS simulation for all possible robotic movements between locations. The robot simulation simulates the robot performing the complex operation and the robot simulation provides the cycle time 154 and the energy consumption 152 of the rating edges 320.

The system determines the energy consumption weight 160 ($f_w$) and the cycle time weight 162 ($f_T$). Each of the energy consumption weight 160 and the cycle time weight 162 can be constant or based on a combination of values including the cycle time 154 and the energy consumption 152. In this embodiment, an energy consumption weight 160 formula defines the weight the energy consumption 152 has on the ratings and a cycle time weight 162 formula defines the weight the cycle time 154 has on the ratings. In certain embodiments, the energy consumption weight 160 and the cycle time weight 162 can be determined via equations (1) and (2), respectively:

$$f_w(W) = \alpha \cdot W \quad (1)$$

$$f_T(T) = \beta \cdot T \quad (2)$$

The system determines a comprehensive edge rating (R) based on one or more of the energy consumption weight 160, cycle time weight 162, the energy consumption coefficient 156 ($\alpha$), the cycle time coefficient 158 ($\beta$), the cycle time 154 (T), and the energy consumption 152 (W). In certain embodiments, the edge rating (R) is determined via equation (3):

$$R = f_w(W) + f_T(T) \quad (3)$$

where R is the rating of the rating edge 320 $w(i)$, W is the energy consumption 152 for the rating edge 320 $w(i)$, and T is cycle time 154 for the rating edge 320 $w(i)$.

$$f_T(T) = \begin{cases} 0, & \text{if } T \leq T_{max} \\ +\infty, & \text{if } T > T_{max} \end{cases} \quad (4)$$

In some embodiments, a step function is used to stay below a maximum value. In this embodiment, the step value ensures the cycle time of the simulation remains below a max time value. In other embodiments, a step function for the energy consumption is used.

$$R_{best} = \min(R_l), l \in \text{population} \quad (5)$$

$$R_{worst} = \max(R_l), l \in \text{population} \quad (6)$$

Based on the energy consumption 152, the cycle time 154, the energy consumption weight 160, the cycle time weight 162, the rating (R), the operation order algorithm provides the optimal breed 174 having the lowest value of all the R values.

Figure 4:
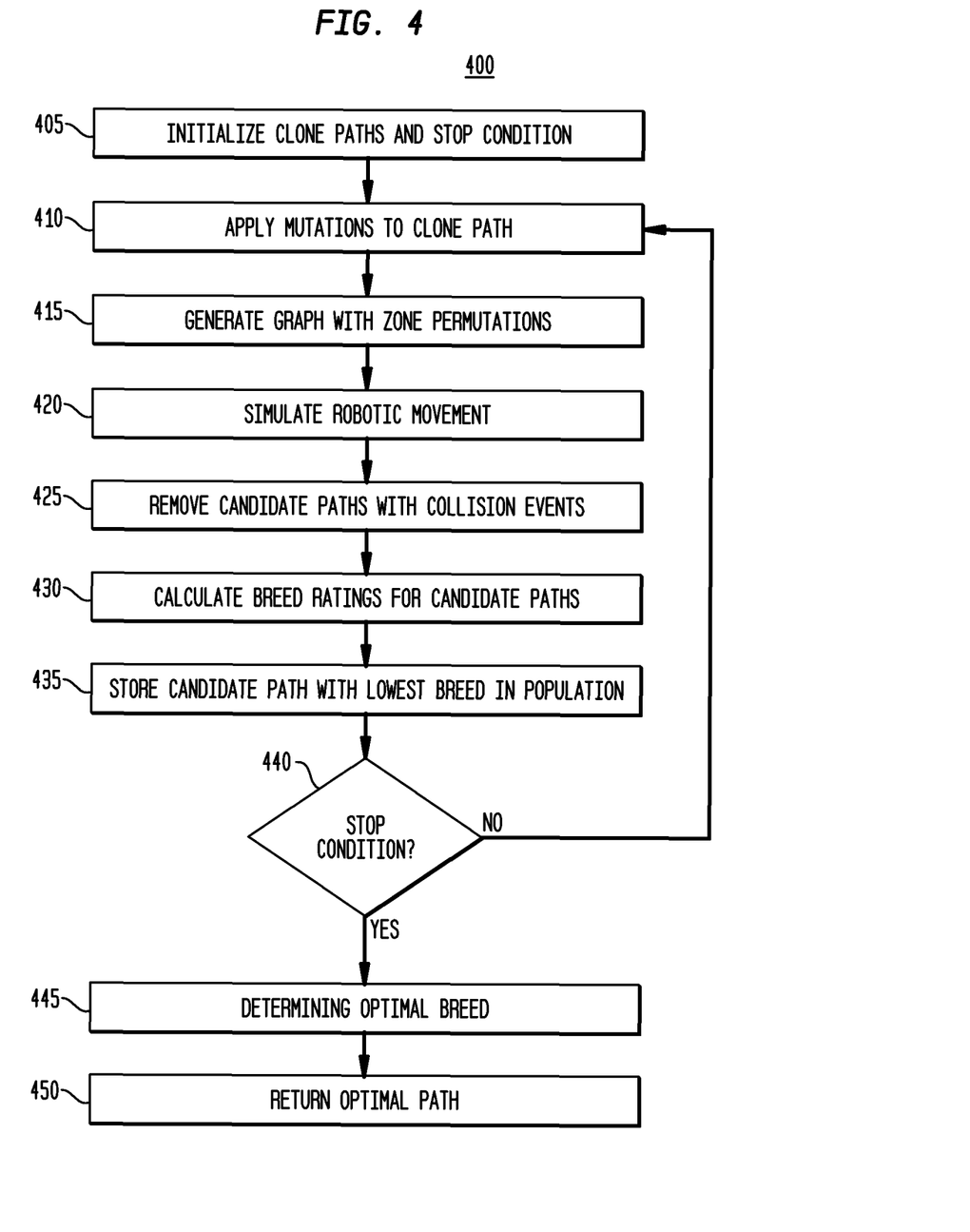
FIG. 4 illustrates flowchart of a process for optimizing energy savings and reducing cycle time for mutating an industrial robotic path when a collision is detected in accordance with disclosed embodiments.

FIG. 4 illustrates a flowchart 400 of a process for saving energy and reducing cycle time by using optimal ordering of the industrial robotic path in accordance with disclosed embodiments that may be performed, for example, by a PLM or PDM system. The energy consumption of the robot is realistic and accurate based on a RRS performed by a data processing system, such as the data processing system 100 of FIG. 1. The RRS interface is known to those of skill in the art, and is described at time of filing, for example, at realistic-robot-simulation.org. The system uses RRS simulation to accumulate the energy consumption for each one of the candidate tools and to find the collisions within the robot environment.

In step 405, the system initializes a plurality of clone paths 240 and a stop condition 176. Where a clone path 240 is a clone of the initial path 166 and the initial path 166 comprises a source location 210, a plurality of intermediate locations 220, and a target location 230. A stop condition 176 determines the number of clones used to determine the most efficient flyby or the amount of failures to find an alternative breed before the system determines the best breed. In some embodiments, the stop condition 176 is based on a number of loops, too many failures, or any other suitable stop condition 176.

The system then determines a candidate path 172 to store in a population 164, by completing steps 410-435, until the stop condition 176 occurs.

In step 410, the system applies a plurality of mutations to the clone path 240. The possible mutations include adding a location, removing a location, or changing a location.

In step 415, the system generates a graph with a plurality of zone permutation vertices 310 for each of the plurality of intermediate locations 220 of the clone path 240 and a plurality of rating edges 320 between each zone permutation vertex 310 of consecutive locations. Where each of the plurality of zone permutation vertices 310 has a radius one increment larger than a previous zone permutation vertex 310.

In step 420, the system simulates robotic movement of the candidate path 172. The energy consumption 152 of the robot is realistic and accurate based on a realistic robot simulation (RRS) performed by a data processing system 100, such as the data processing system 100 of FIG. 1. The RRS interface is known to those of skill in the art, and is described at time of filing, for example, at realistic-robot-simulation.org. The system uses RRS simulation to accumulate the energy consumption 152 for each one of the candidate paths 172 and to find the collisions within the robot environment.

Next, the candidate list of zones is validated as collision-free. The calculated shortest path represents a list of locations with candidate zones. To evaluate the validity of the candidate zones in terms of collisions, the corresponding zones are applied on the locations and the path is simulated using RRS. The process records a simulated energy consumption 152 and cycle time 154 for the candidate path 172. If collisions occur during the simulation, the process records information identifying the locations between which collisions occurred. In some embodiments, information relating to proximity of the collision to one of the locations may be recorded.

In step 425, the system removes a candidate path 172 when a collision is detected on that candidate path. Once the candidate path 172 is removed, the system proceeds with the next candidate path 172 at step 410.

In step 430, the system calculates the breed ratings 168 for the candidate paths 172. Where the breed rating 168 comprises a summation of the rating edges 320 for the candidate path 172.

In step 435, the system stores the candidate path 172 possessing the lowest breed rating 168 in the population 164.

In step 440, the system determines if the stop condition 176 occurs. When the stop condition 176 has not occurred, the process moves to the next clone path mutation at step 410. If the stop condition 176 has occurred, the process continues with step 445.

In step 445, the system determines an optimal breed 174 comprising the candidate path 172 with an optimal rating 170. Where the optimal rating 170 is determined by the lowest breed rating 168 for a candidate path 172 stored in the population 164.

In step 450, the system returns the optimal breed 174, and can store or display the optimal breed 174.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being illustrated or described herein. Instead, only so much of a data processing system as is unique to the present disclosure or necessary for an understanding of the present disclosure is illustrated and described. The remainder of the construction and operation of data processing system may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for optimizing energy savings and reducing cycle time for mutating an initial path when a collision is detected, the method performed by a data processing system and comprising:
   initializing a plurality of clone paths where the collision was detected and a stop condition, wherein a clone path is a clone of the initial path and the initial path comprises a source location, a plurality of intermediate locations, and a target location;
   until the stop condition occurs, determining a candidate path to store in a population by repeating:
      applying a plurality of mutations to a selected clone path;
      generating a graph with a plurality of zone permutation vertices for each of the plurality of intermediate locations of the selected clone path and a plurality of rating edges between each zone permutation vertex of consecutive locations, wherein each of the plurality of zone permutation vertices has a radius one increment larger than a previous zone permutation vertex;
      simulating robotic movement of the candidate path to determine values for the rating edges, wherein the value of the rating edges is based on an energy consumption and a cycle time;
      removing the candidate path when a collision is detected;
      calculating a breed rating for each of a plurality of candidate paths, wherein the breed rating comprises a summation of the rating edges for the candidate path; and
      storing the candidate path possessing a lowest breed rating in the population;
   determining an optimal breed comprising the candidate path with an optimal rating, wherein the optimal rating is determined by the lowest breed rating in the population; and
   operating a robot using the optimal breed.

2. The method of claim 1, wherein applying the plurality of mutations comprises moving intermediate locations, removing intermediate locations, or adding intermediate locations.

3. The method of claim 1, wherein determining the candidate path to store in the population comprises ending for the selected clone path when a collision is detected for the selected clone path after the mutations have been applied.

4. The method of claim 1, wherein determining an optimal breed comprises using a directed acyclic graph algorithm.

5. The method of claim 1, further comprising:
   for each of the plurality of rating edges, determining an energy consumption coefficient and a cycle time coefficient.

6. The method of claim 5, further comprising:
   for each of the plurality of rating edges, determining an energy consumption weight and a cycle time weight based on the energy consumption coefficient, the cycle time coefficient, the cycle time, and the energy consumption of the rating edge.

7. The method of claim 6, further comprising:
   for each of the plurality of rating edges, determining the breed rating based on one or more of the energy consumption weight, the cycle time weight, the energy consumption coefficient, the cycle time coefficient, the cycle time, and energy consumption of the rating edge.

8. A data processing system comprising:
   a processor; and
   an accessible memory, the data processing system particularly configured to:
      initialize a plurality of clone paths where a collision was detected and a stop condition, wherein a clone path is a clone of an initial path and the initial path comprises a source location, a plurality of intermediate locations, and a target location;
      until the stop condition occurs, determine a candidate path to store in a population by repeating:
         apply a plurality of mutations to a selected clone path;
         generate a graph with a plurality of zone permutation vertices for each of the plurality of intermediate locations of the selected clone path and a plurality of rating edges between each zone permutation vertex of consecutive locations, wherein each of the plurality of zone permutation vertices has a radius one increment larger than a previous zone permutation vertex;
         simulate robotic movement of the candidate path to determine values for the rating edges, wherein the value of the rating edges is based on an energy consumption and a cycle time;
         remove the candidate path when a collision is detected;
         calculate a breed rating for each of a plurality of candidate paths, wherein the breed rating comprises a summation of the rating edges for the candidate path; and
         store the candidate path possessing a lowest breed rating in the population;
      determine an optimal breed comprising the candidate path with an optimal rating, wherein the optimal rating is determined by the lowest breed rating in the population; and
      operate a robot using the optimal breed.

9. The data processing system of claim 8, wherein to apply the plurality of mutations comprises moving intermediate locations, removing intermediate locations, or adding intermediate locations.

10. The data processing system of claim 8, wherein to determine the candidate path to store in the population comprises to end for the selected clone path when a collision is detected for the selected clone path after the mutations have been applied.

11. The data processing system of claim 8, wherein to determine an optimal path comprises using a directed acyclic graph algorithm.

12. The data processing system of claim 8, further comprising:
   for each of the plurality of rating edges, determine an energy consumption coefficient and a cycle time coefficient.

13. The data processing system of claim 12, further comprising:
for each of the plurality of rating edges, determine an energy consumption weight and a cycle time weight based on the energy consumption coefficient, the cycle time coefficient, the cycle time, and the energy consumption of the rating edge.

14. The data processing system of claim 13, further comprising:
for each of the plurality of rating edges, determine the breed rating based on one or more of the energy consumption weight, the cycle time weight, the energy consumption coefficient, the cycle time coefficient, the cycle time, and energy consumption of the rating edge.

15. A non-transitory computer-readable medium encoded with executable instructions that, when executed, cause one or more data processing systems to:
initialize a plurality of clone paths where a collision was detected and a stop condition, wherein a clone path is a clone of an initial path and the initial path comprises a source location, a plurality of intermediate locations, and a target location;
until the stop condition occurs, determine a candidate path to store in a population by repeating:
apply a plurality of mutations to a selected clone path;
generate a graph with a plurality of zone permutation vertices for each of the plurality of intermediate locations of the selected clone path and a plurality of rating edges between each zone permutation vertex of consecutive locations, wherein each of the plurality of zone permutation vertices has a radius one increment larger than a previous zone permutation vertex;
simulate robotic movement of the candidate path to determine values for the rating edges, wherein the value of the rating edges is based on an energy consumption and a cycle time;
remove the candidate path when a collision is detected;
calculate a breed rating for each of a plurality of candidate paths, wherein the breed rating comprises a summation of the rating edges for the candidate path; and
store the candidate path possessing a lowest breed rating in the population;
determine an optimal breed comprising the candidate path with an optimal rating, wherein the optimal rating is determined by the lowest breed rating in the population; and
operate a robot using the optimal breed.

16. The computer-readable medium of claim 15, wherein to apply the plurality of mutations comprises moving intermediate locations, removing intermediate locations, or adding intermediate locations.

17. The computer-readable medium of claim 15, wherein to determine the candidate path to store in the population comprises to end for the selected clone path when a collision is detected for the selected clone path after the mutations have been applied.

18. The computer-readable medium of claim 15, wherein to determine an optimal path comprises using a directed acyclic graph algorithm.

19. The computer-readable medium of claim 15, further comprising:
for each of the plurality of rating edges, determine an energy consumption coefficient and a cycle time coefficient.

20. The computer-readable medium of claim 19, further comprising:
for each of the plurality of rating edges, determine an energy consumption weight and a cycle time weight based on the energy consumption coefficient, the cycle time coefficient, the cycle time, and the energy consumption of the rating edge.

* * * * *